No. 710,067. Patented Sept. 30, 1902.
A. D. LUNT.
SYSTEM OF ELECTRICAL DISTRIBUTION.
(Application filed Jan. 31, 1901.)
(No Model.)
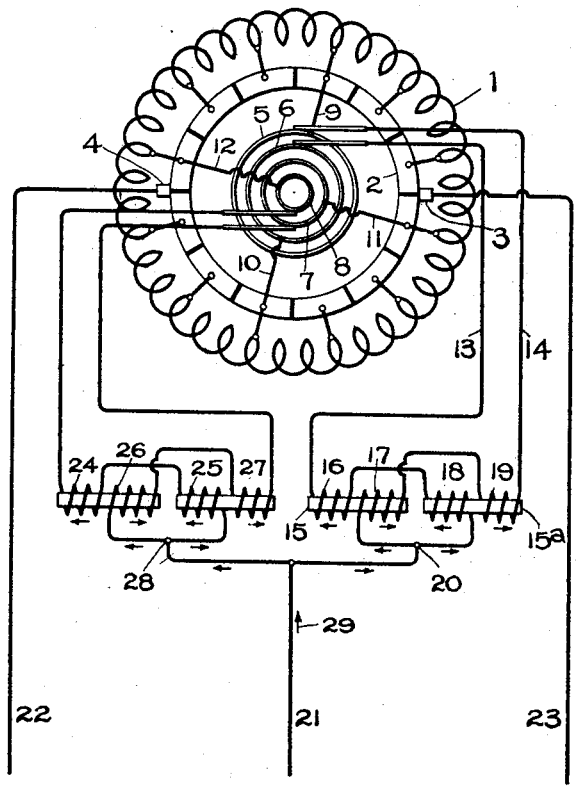
Witnesses.
Lewis P. Abell.
Benjamin B. Hull.
Inventor.
Alexander D. Lunt,
by Albert G. Davis
Atty.

UNITED STATES PATENT OFFICE.

ALEXANDER D. LUNT, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 710,067, dated September 30, 1902.

Application filed January 31, 1901. Serial No. 45,488. (No model.)

*To all whom it may concern:*

Be it known that I, ALEXANDER D. LUNT, a citizen of the United States, residing at Schenectady, county of Schenectady, State of New York, have invented certain new and useful Improvements in Systems of Electrical Distribution, (Case No. 1,887,) of which the following is a specification.

In dynamo-electric machines of the type provided with commutators it is frequently desirable to obtain a point having a potential which is neutral with respect to the distribution of potential about the winding to which the commutator is connected. This neutral point permits an operative connection to be made between a neutral conductor and said machine. This neutral conductor may be employed as the neutral of a multiple-conductor distribution system or for any other desired purposes.

My present invention relates to certain novel means for connecting a neutral conductor through a point of neutral potential to an armature-winding of a dynamo-electric machine, the points of novelty of the same being set forth in claims appended hereto.

As to the details of the invention, reference is to be had to the following description and accompanying drawing, which shows my invention as applied to a direct-current machine, either generator or motor. It is to be understood, however, that the invention is equally applicable to any machine provided with a commutator—such, for example, as rotary converters, double-current generators, continuous-current converters, or the like.

In the drawing the armature-winding of the direct-current machine to which my invention is shown as applied is indicated at 1. A commutator 2 is connected in the usual manner to this winding, and upon the commutator bear brushes 3 and 4. The field-winding of the machine may be of any usual character, and as it forms no essential part of the present invention it is considered unnecessary to illustrate the same.

To obtain the point of neutral potential above referred to, I connect a plurality of counter-electromotive-force devices—such, for example, as compensators or transformers—in multiphase relation to the armature-winding 1, the connections being effected through the instrumentality of a suitable number of collector-rings 5, 6, 7, and 8, four rings being chosen in this case to correspond with quarter-phase connections to the armature-winding, these connections being indicated by the four equiangularly-displaced taps 9, 10, 11, and 12, connected, respectively, to the collector-rings before mentioned.

From the collector-rings 5 6, corresponding to the diametrically-opposed taps 9 10, extend conductors 13 14, these conductors making suitable contact with the collector-rings through sliding contact-brushes or the like. The conductors 13 and 14 are operatively joined to a plurality of series-connected windings located on separate magnetic cores 15 15ª. These windings are interconnected with each other, so that the circuit passes from one of the mains 13 14 first through a winding on one core, then through a winding on the other core, then back to a winding on the first-mentioned core, and then through the remaining winding on the second core. The direction of the windings on each core are such that the alternating currents supplied thereto from the conductors 13 14 magnetize the core in the same direction. The two cores and their windings therefore have practically the same effect as a single inductance-coil.

The windings before referred to are indicated in the drawings at 16, 17, 18, and 19, and their connections may readily be traced. The circuit will be seen to pass from the conductor 13 through the coil 16 on the core 15, through the coil 18 on the core 15ª, then back and through the coil 17 on the first core 15, then returning through the coil 19 on the core 15ª to the remaining conductor 14. The turns in the several coils are in such a direction as to cause the two coils on each core to magnetize in the same direction, as will be evident.

The point 20, located midway in the length of the coils 16 to 19, inclusive, is a point of neutral potential with respect to the winding 1, as will be evident to those skilled in the art. To this point of neutral potential is connected a neutral conductor 21, which coöperates with the direct-current mains 22 and 23 to constitute a three-wire direct-current system, these mains being connected, as will be seen, to the commutator-brushes 3 4, bearing upon the commutator 2.

The device so far as described is perfectly operative, but in practice would be objectionable both on account of the heating of the armature-conductors near the alternating-current taps to the collector-rings and also on account of the pulsating armature reaction due to the single-phase connection of the compensators or inductance-coils across the armature-windings 1. To avoid objections of this character, I connect a second set of compensators or inductance-coils through collector-rings to the remaining taps 11 12, which are in quarter-phase relation to the first pair of taps 9 10. These compensators are in all respects like those already described, and therefore require no extra description. The windings of the same are indicated at 24, 25, 26, and 27 and are connected in a manner previously described, the point 28 in this case representing the point of neutral potential lying between the two pairs of coils 24 25 and 26 27.

The neutral points 20 and 28 being of the same potential are joined together, as shown, to the neutral conductor 21, the junction between the neutral points of course carrying no current except the direct current flowing in one direction or the other in the neutral conductor 21. Suppose, for example, the current in the neutral conductor to be flowing in the direction indicated by the arrow 29. This current will then divide and pass through the several compensator-coils shown, the directions of the currents being indicated by the arrows. It will be seen that the direct current from the neutral passing through the coil on one core tends to magnetize that core in the opposite direction from the direct current passing through the other coil on the same core. Thus the direct current in the coil 17 tends to magnetize in the opposite direction from the direct current in the coil 16 on the same core. The direct current in the compensators will therefore be seen to have no resultant magnetizing effect, thereby preventing the saturation of the cores which would otherwise result. Such saturation, if it were allowed to take place, would largely increase the magnetizing-current due to the alternating electromotive forces impressed upon the compensators, thereby largely reducing the efficiency of the apparatus.

What I claim as new, and desire to secure by Letters Patent of the United States, is—

1. The combination of a plurality of inductance-coils, the windings of which are traversed by superposed alternating and direct current, and connections between said windings such that the direct current has no resultant magnetizing effect.

2. The combination of a plurality of cores, windings on said cores traversed by superposed alternating and direct current, and connections between the said windings such that there is no resultant magnetizing effect due to the direct current.

3. The combination of a plurality of cores of magnetic material, a plurality of windings on each of said cores, and connections interlinking all of the windings in series, the connections being such that no two windings on a single core are interlinked in immediate succession.

4. The combination of a plurality of cores of magnetic material, a plurality of windings on each of said cores, means for passing superposed alternating and direct current through said windings, and connections between said windings such that the direct current in one of the windings on a core is balanced in its magnetizing effect by direct current in another of said windings.

5. The combination of an armature, a plurality of windings connected in series across points in said armature, means for passing direct current through said windings, and connections between said windings such as to render negligible the resultant magnetizing effect of the direct current in said windings.

6. The combination with the armature-winding of a dynamo-electric machine, of a commutator connected to said winding, sets of inductively-related coils, a main leading to a connection between two of the coils, and interconnections between the coils such that current in said main has no resultant magnetizing effect.

7. The combination of a plurality of series-connected sets of inductively-related coils, a main leading to a connection between two of the coils, the interconnection between all of the coils being such that current in said main has no resultant magnetizing effect, and means for supplying current to said main.

8. The combination of a plurality of cores of magnetic material, a plurality of windings on each of said cores, connections interlinking said windings in series, means for passing alternating current through said windings in series, and means for passing direct current through a divided or branched circuit formed of said windings.

In witness whereof I have hereunto set my hand this 30th day of January, 1901.

ALEXANDER D. LUNT.

Witnesses:
BENJAMIN B. HULL,
MARGARET E. WOOLLEY.